July 16, 1940.   C. W. STUART   2,208,347
ARTICLE CARRIER
Filed June 22, 1939   2 Sheets-Sheet 1
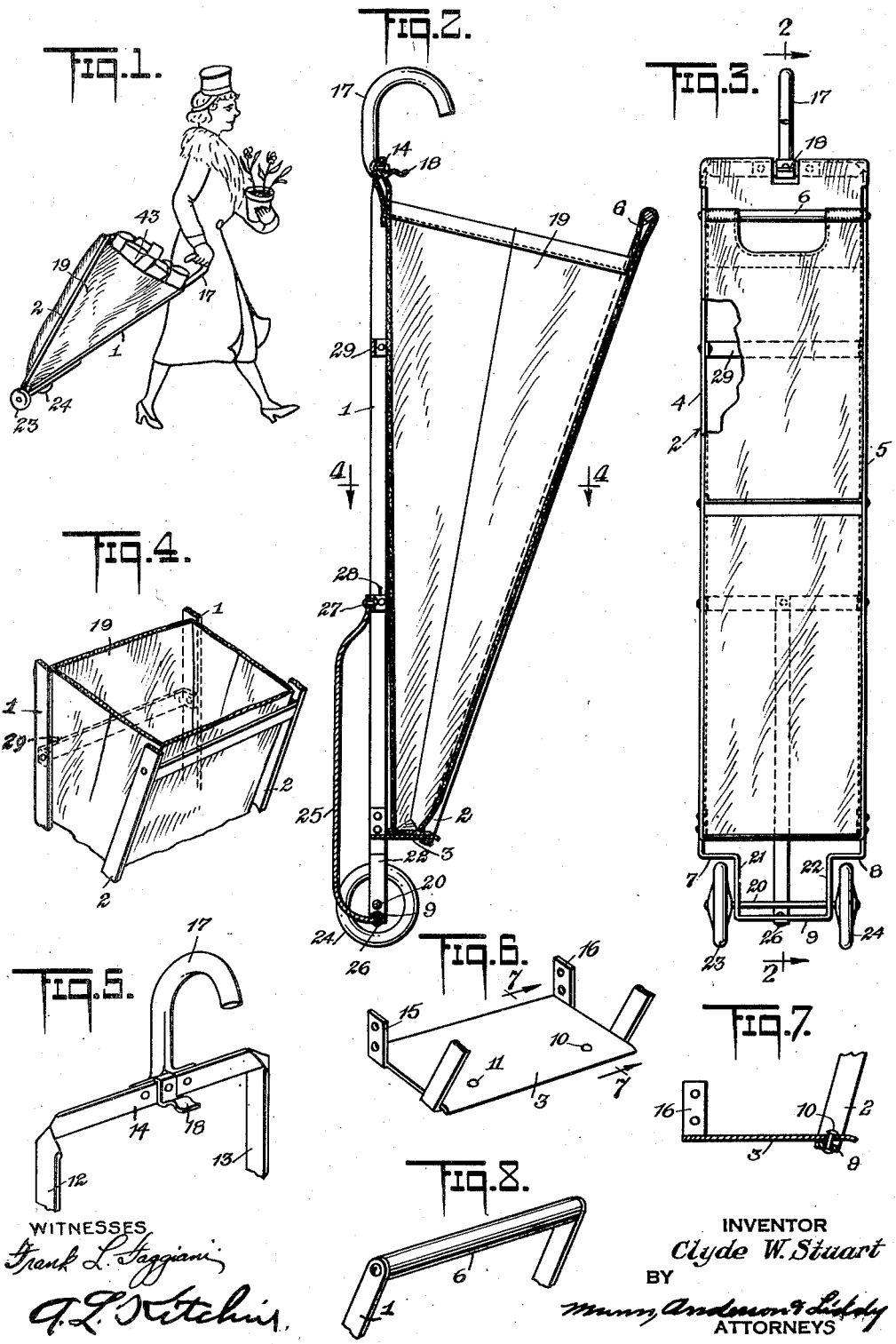
INVENTOR
Clyde W. Stuart July 16, 1940.   C. W. STUART   2,208,347
ARTICLE CARRIER
Filed June 22, 1939   2 Sheets-Sheet 2
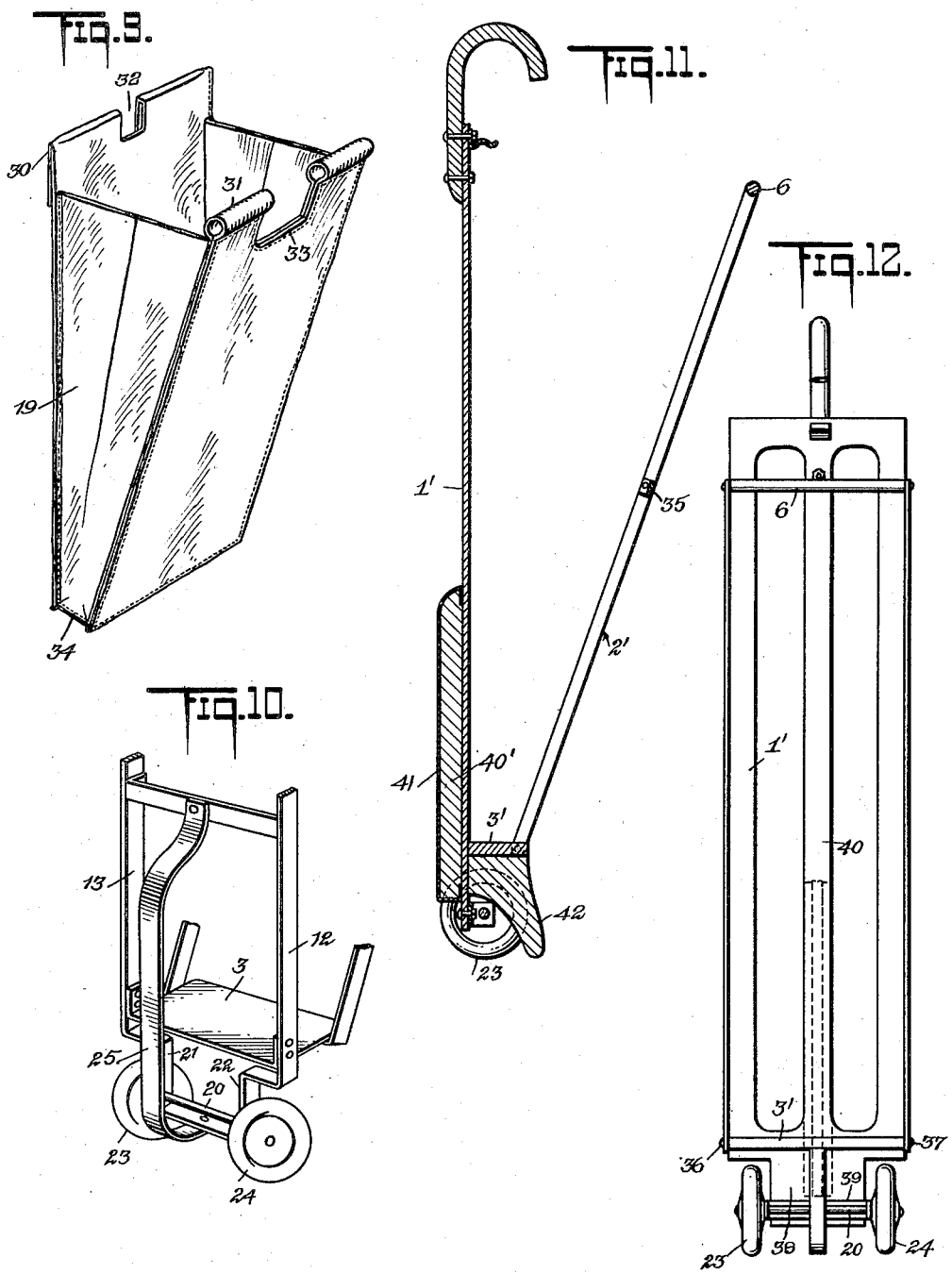
WITNESSES
INVENTOR
Clyde W. Stuart
BY
ATTORNEYS Patented July 16, 1940

2,208,347

UNITED STATES PATENT OFFICE 2,208,347

ARTICLE CARRIER

Clyde W. Stuart, New York, N. Y.

Application June 22, 1939, Serial No. 280,450

1 Claim. (Cl. 280—53)

This invention relates to carriers and particularly to an improved article carrier, an object being to provide a construction which may be readily carried when empty and which may be pulled along the ground when filled.

Another object of the invention is to provide a carrier especially adapted for market use by housewives, wherein the carrier may be easily supported on the arm when empty and supported on a pair of wheels when filled, with the parts so arranged that the carrier will automatically move over curbstones as it is pulled along the ground.

An additional and more specific object of the invention is to provide a carrier having stationary and movable frames and a removable collapsible bag connected with the frames.

An additional object is to provide a carrier which is adapted to be pulled over the ground when filled and which is provided not only with a guiding rudder for easy travel of the carrier over curbstones, but with a supporting brace or foot for holding the carrier upright whenever desired.

In the accompanying drawings—

Fig. 1 is a view illustrating a carrier embodying the invention in perspective, together with the figure of a person pulling the same over the ground;

Fig. 2 is a vertical sectional view through Fig. 3 approximately on the line 2—2;

Fig. 3 is a front elevation of the structure shown in Fig. 2, the same disclosing a carrier embodying the invention;

Fig. 4 is a transverse sectional view through Fig. 2 approximately on the line 4—4;

Fig. 5 is a perspective view of the upper part of the stationary frame shown in Fig. 2;

Fig. 6 is a perspective view of the bottom plate shown in Fig. 2;

Fig. 7 is a fragmentary sectional view through Fig. 6 approximately on the line 7—7;

Fig. 8 is a perspective view of the upper end of the movable frame shown in Fig. 2;

Fig. 9 is a perspective view of the bag shown in Figs. 1 and 2;

Fig. 10 is a perspective view of the lower part of the frame shown in Fig. 2;

Fig. 11 is a sectional view similar to Fig. 2 but showing a modified form of the invention with the bag eliminated;

Fig. 12 is a front view of the structure shown in Fig. 11.

Referring to the accompanying drawings by numerals, 1 indicates a stationary frame and 2 a movable frame, or rather a swingable frame, pivotally connected with a bottom plate 3, as shown in detail in Fig. 7. The swingable frame 2 is formed with a pair of side metallic plates 4 and 5 connected at the upper end by a bar 6 which is preferably round in cross section and at the lower end is bent to provide shoulders 7 and 8 and a connecting strap 9. The connecting strap 9 is provided with rivets 10 and 11 which loosely extend through suitable apertures in the plate 3, as shown in Fig. 7. This provides a desired connection of the swingable frame 2 with the bottom plate 3 while allowing the frame to swing freely. The stationary or fixed frame also is provided with side bars 12 and 13 and a cross bar 14 at the top preferably made of one piece. At the bottom the side bars 12 and 13 are preferably riveted to upstanding ears 15 and 16 which may be integral with plate 3 or may be rigidly secured thereto in any desired manner. A curved handle 17 is riveted or otherwise rigidly secured to the cross bar 14 so that it may be hooked over the arm of a person when it is desired to carry the carrier on the arm. As shown in Fig. 5, a catch 18 is also riveted to the cross arm 14, said catch being adapted to interlock with the center part of the bar 6 to hold the movable frame against the stationary frame when the bag 19 is collapsed. As shown in Figs. 2 and 3, an axle 20 extends through suitable apertures in the sections 21 and 22 of the shoulder members 7 and 8 and mounted on this axle are traction wheels 23 and 24. A runner or guard 25 of metal is connected at 26 to the cross bar or strap 9 and at 27 to a bracing bar 28, which bar is riveted or otherwise rigidly secured to the side bars 12 and 13. The bracing bar 28 is arranged about one-third of the distance from the bottom to the top and a second bracing bar 29 is arranged approximately at a position half way between the bar 28 and the cross bar 14. These bars properly brace the side bars 12 and 13 and also provide a back against which one wall of the bag 19 may rest when the carrier is being used as shown in Fig. 1.

The bag 19 is preferably formed of canvas or other suitable fabric and is provided with looped over portions or hems 30 and 31, as shown in Fig. 9. A notch 32 is provided in the hem 30 to accommodate handle 17, while a notch 33 is provided in the hem 31 to accommodate catch 18 and also to provide a handle so that bar 6 may be grasped and swung back and forth as desired. The bag 19 has converging sides and a flat bottom 34 which rests on the bottom member or plate 3 when the bag is in use.

Figs. 11 and 12 illustrate a slightly modified construction which may be made of wood if desired. In this form of the invention the swingable frame 2' is preferably formed of metal and provided with a central brace 35 as well as the bar 6. At the lower end, however, the frame 2 is secured by screws or pins 36 and 37 to a bottom plate 3' which is preferably of wood. The stationary frame 1' is preferably made of wood and may be made in one piece. This frame is provided with an integral extension 38 at the bottom to which a metal U-shaped bracket 39 is bolted or otherwise rigidly secured. The two legs of the bracket 39 are apertured to accommodate the shaft or axle 20 which carries the wheels 23 and 24. A strip of wood 40' is secured by nails or otherwise to the central panel 40 of frame 1' and a protecting strip of metal 41 is arranged thereover. This structure presents a runner adapted to function similar to the metal runner 25. In addition, a leg or foot 42 is secured by nails or other means to the bottom 3' and is adapted to rest on the ground when the frame 1' is substantially vertical, whereby the carrier may be set upright for the ready reception of articles to be placed therein. From Fig. 1 of the drawings it will be readily seen that the number of articles placed therein would be too heavy for a person to carry comfortably but by placing the same in the carrier the shopper may readily transport the packages from store to store and from a store to the home.

I claim:

An article carrier including a stiff rectangular metal frame formed at one end with a top cross bar and at the bottom with a reduced rectangular extension, a shaft extending through said extension, a traction wheel mounted on said shaft on each side of said extension, said traction wheels being offset inwardly from the side of the stiff frame, a substantially rectangular bottom member rigidly secured to said stiff frame at a point spaced from said reduced extension, a rectangular swinging frame pivotally secured at one end to said bottom member adjacent its outer edge, said swinging frame being of substantially the same size and shape as said stiff frame, a catch secured to the top cross bar of said stiff frame functioning to disengageably secure the top end of said swinging frame to said cross bar, said stiff frame having a cross bracing bar intermediate the length thereof and a runner secured at one end to said reduced extension near the center thereof and to said cross bracing bar.

CLYDE W. STUART.